Patented June 24, 1941

2,246,540

UNITED STATES PATENT OFFICE 2,246,540

ENOLIC ETHERS OF KETO - CYCLOPENTANOPOLYHYDRO-PHENANTHRENE COMPOUNDS AND METHOD OF PREPARING SAME

Erwin Schwenk, Montclair, N. J., and Bradley Whitman, New York, N. Y., assignors to Schering Corporation, Bloomfield, N. J., a corporation of New Jersey No Drawing. Application February 26, 1937, Serial No. 127,912

25 Claims. (Cl. 260—397)

The present invention relates to the production of derivatives of keto-cyclopentano polyhydro phenanthrene compounds, including compounds having the steroid carbon atom skeleton, degradation products of sterols, compounds having the carbon skeleton of the male germinal gland hormone, and more particularly of enolic ethers corresponding to such keto-compounds.

It is in general the object of the present invention to provide a process for the production of enolic ether derivatives of $\alpha,\beta$-nuclearly unsaturated keto-dimethyl-cyclopentano-polyhydrophenanthrene compounds, the starting compounds being thus rendered more unsaturated, and thereby producing substances of value as intermediates in the production of therapeutic preparations, and particularly of substances having hormone properties.

We have found that it is possible to convert the ketones of the cyclopentano polyhydro phenanthrene series, including the ketones of the sterol series, which contain in the first ring (ring A) a keto group in the 3-position and a double bond in the same ring (either 1, 2 or 4, 5), into ethers of the enol form of the ketones. The substances so obtained contain not only the double bond previously present in the first ring, but also a new double bond, so that a system of two conjugated double bonds in the nucleus is formed.

The reaction according to the invention is carried out by the action of the esters of orthoformic acid, HC(OH)₃, in the presence of a small amount of a strong mineral or inorganic acid, i. e. one at least about as strong as phosphoric acid, which acts as a catalyst the acid being one that acts only catalytically and has no decomposing or permanent substituting action on the starting material. The mixture sometimes becomes warm and should then be cooled to check the turbulent reaction. The new compounds crystallize from the reaction mixture as they are more difficultly soluble in organic solvents than the starting material. The reaction is represented by the following scheme:

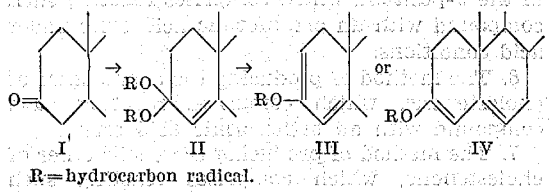

R=hydrocarbon radical.

Apparently the diethers II are first formed, but under the conditions of our reaction, they split out one molecule of alcohol, so that only the monoethers III can be isolated. The absorption spectrum of some of these compounds shows a strong absorption at 240m$\mu$, which indicates that both double bonds may be in the first ring; however, it is possible, and in certain cases quite likely, that the two double bonds are distributed between the first two rings.

In the following examples, wherein the invention is disclosed in greater detail for purposes of illustration, the products obtained from cholestenone, testosterone benzoate, testosterone, and isocholestenone (Butenandt) are described, but the reaction can be carried out with all other cyclopentano polyhydro phenanthrene compounds having one keto group in the alpha position to a double bond in the first ring, such as the iso-testosterone of Butenandt, androstenedione, the pregnen-20-ol-3-one and other similar compounds. Instead of the ethyl ether of the orthoformic acid, other ethers may be used and the sulfuric acid may be replaced by gaseous hydrochloric acid, hydrobromic acid, phosphoric acid or other, preferably strong, catalytically acting mineral or inorganic acids, that is, acids which do not decompose or add permanent substituents to the starting material.

Example 1

5 gms. of cholestenone are dissolved in 10 cc. of ethyl orthoformate and 1 cc. of formic acid is added. To this mixture, which is cooled to about 15°, 1 drop of concentrated sulfuric acid is added. The mixture becomes yellow and orange, then dark-brown and finally bluish-green. The temperature rises slowly and it is advisable to heat cautiously, so that the temperature of 40–50°, measured inside the mixture is maintained for 15 minutes. The mixture is left for 20 hours and is then worked up by filtering the crystals which have precipitated. The crystals are dissolved in ether and the ether solution is thoroughly washed with water, soda solution, water again, and dried. The ether solution becomes yellow and after evaporation, a yellow, oily residue is obtained which crystallizes easily. This material is recrystallized from acetone. Beautiful crystals are obtained, showing a melting point of 82–85° C. A mixed melting point with cholestenone gives a depression of about 15°. Analysis and determination of the ethoxyl shows the compound to have the formula:

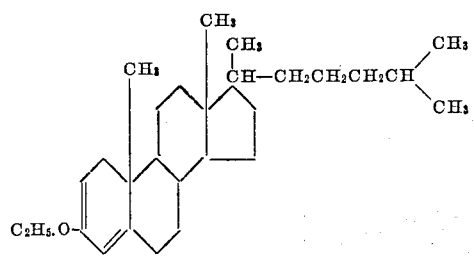

or

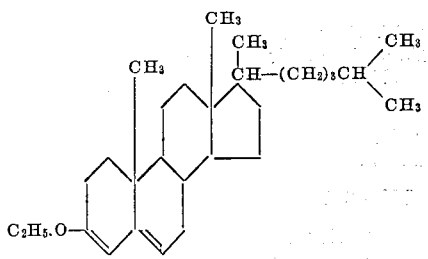

Cholestadiene-3-ol-ethylether.

In both cases the double bonds are attached to the 3 and 5 carbons, but which is the actual formula cannot yet be stated with certainty.

*Example 2*

5 gms. of testosterone benzoate are heated with 20 cc. of ethyl orthoformate and 2 cc. of formic acid. Upon cooling, the material crystallizes out again. 1 drop of concentrated sulfuric acid is added and the mixture cautiously heated to 50° C. and maintained for 1/2 hour, whereupon the material becomes, first yellow, and finally bluish-green. Upon cooling, the reaction mixture solidifies. It is then left for 20 hours and worked up as described in Example 1. The material obtained is recrystallized twice from acetone and forms beautiful shining leaflets, showing a melting point of 189° C. A mixed melting point with testosterone benzoate gives a depression of about 15–20°. Analysis and ethoxyl determination shows that the compound has the general formula $C_{28}H_{36}O_3$ corresponding to the following structural formula:

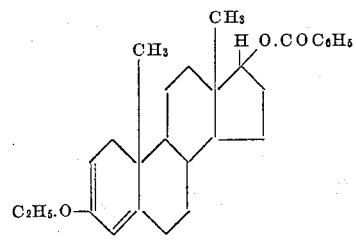

or

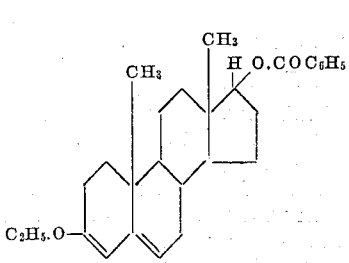

3 ethoxy-17-benzoyloxy androstadiene.

*Example 3*

1 gm. of testosterone is dissolved in 2 cc. of ethyl ortho formate and 0.5 cc. of formic acid added. A small drop of phosphoric acid is given into the mixture, whereupon the same coloration phenomena are observed as described in the foregoing examples. The reaction is conducted in the same manner as before indicated and the product isolated. It melts at 122° C. Mixing with testosterone causes a strong depression of the melting point.

*Example 4*

2 gms. of isocholestenone (Butenandt and Wolff: Ber: 1935, p. 2091) are dissolved in 5 cc. of ethyl orthoformate and 1 cc. of formic acid containing 1 drop of sulfuric acid is added. The reaction proceeds in a manner similar to that described in the previous examples, and the reaction mixture is worked up in the same way. Beautiful crystals are obtained from acetone, which begin to melt at 110° and are molten at 120°. Mixing with the starting material, as well as with the isomeric compounds described in Example 1, causes a strong depression of the melting point.

Other ethers than those above described can be obtained by employing the corresponding esters of orthoformic acid. Thus, the methyl, butyl, allyl and other esters of orthoformic acid will produce the methyl, butyl, allyl, etc. ethers of the starting materials.

We claim:

1. The method of producing an enolic ether of a 10,13 - dimethyl-cyclopentano-polyhydrophenanthrene compound which comprises subjecting a 3-keto-10,13-dimethyl-cyclopentano-polyhydro-phenanthrene compound having a double bond in the first ring to the action of an orthoformic acid ester.

2. The method of producing an enolic ether of a 10,13 - dimethyl-cyclopentano-polyhydro-phenanthrene compound which comprises subjecting a 3-keto - 10,13 - dimethyl-cyclopentano-polyhydro-phenanthrene compound having a double bond in the first ring to the action of an orthoformic acid ester in the presence of a strong mineral acid catalyst.

3. The method of producing an enolic ether of a 10,13-dimethyl-cyclopentano-polyhydro-phenanthrene compound which comprises subjecting a 3 - keto-10,13-dimethyl-cyclopentano-polyhydro-phenanthrene compound having a double bond in the first ring to the action of an orthoformic acid ester in the presence of a catalytically acting mineral acid which is at least approximately as strong as phosphoric acid.

4. The method of producing an enolic ether of a 10,13-dimethyl - cyclopentano - polyhydro-phenanthrene compound which comprises subjecting a 3-keto-10,13-dimethyl-cyclopentano-polyhydrophenanthrene compound having a double bond in the first ring to the action of an orthoformic acid ester in the presence of formic acid and of a catalytically acting mineral acid which is at least approximately as strong as phosphoric acid, and separating the enolic ether so obtained.

5. The method of introducing an additional double bond into a 10,13-dimethyl-cyclopentano-polyhydro-phenanthrene compound having a double bond in the first ring and a keto group in the 3-position, which comprises reacting such compound with an orthoformic acid ester under acid conditions.

6. The method of producing the enolic ether of cholestenone, which comprises reacting such compound with an orthoformic acid ester.

7. The method of producing the enolic ether of cholestenone, which comprises reacting such compound with ethyl orthoformate in the presence of formic acid which is at least approximately as strong as phosphoric acid and of a relatively small quantity of a catalytically acting mineral acid, and separating the crystals of cholesta-diene-3-ol-ethylether so obtained.

8. The method of producing the enolic ether of an ester of testosterone which comprises reacting an ester of testosterone with ethyl orthoformate in the presence of formic acid and of a relatively small quantity of a catalytically acting mineral acid which is at least approximately as strong as phosphoric acid, and separating the 3-ethoxy-17-acyl-oxy-androsta-diene so obtained.

9. The method of producing the enolic ether of testosterone which comprises reacting testosterone with an ester of orthoformic acid.

10. The method of producing the enolic ether of testosterone which comprises reacting testosterone with ethyl ortho formate in the presence of formic acid and of a small quantity of a strong, catalytically acting inorganic acid, and separating the enolic ether so obtained.

11. The method according to claim 7, wherein the starting material is iso-cholestenone and yields the corresponding enolic ether.

12. A 10,13-dimethyl-cyclopentano-polyhydrophenanthrene compound having a conjugated double bond system of which one double bond is attached to the 3-carbon, and having a lower alkyl ether group in the 3-position.

13. A 10,13-dimethyl-cyclopentano-polyhydrophenanthrene compound having a conjugated double bond system of which one double bond is attached to the 3-carbon, and having an ethoxy group in the 3-position.

14. A derivative of a sterol having a lower alkyl ether group in the 3-position and having a conjugated double bond system of which one double bond is attached to the 3-carbon.

15. A derivative of a male hormone having a lower alkyl ether group in the 3-position and having a conjugated double bond system of which one double bond is attached to the 3-carbon.

16. A testosterone derivative having an enolic lower alkyl ether structure in the first ring.

17. Cholestadiene-3-ol ethylether, the two double bonds forming a conjugated system, one double bond being attached to the 3-carbon.

18. A 10,13 - dimethyl-3-OR-17-R'-cyclopentano-polyhydro-phenanthrene compound having conjugated double bonds at the 3 and 5 carbons, R being a lower alkyl group and R' a member of the class consisting of hydroxyl and O-acyl.

19. 3-ethoxy-17-acyloxy-androstadiene.

20. The enolic, lower alkyl ether of isocholestenone-3.

21. The enolic lower alkyl ether of a cholestenone-3.

22. An enolic lower alkyl ether derivative of an $\alpha,\beta$-nuclearly unsaturated ketone of the 10,13-dimethyl-cyclopentano-polyhydro-phenanthrene series, the alkoxy group being in the 3-position.

23. A 10,13-dimethyl cyclopentano polyhydro phenanthrene compound having an ether group linked to the 3-carbon, said 3-carbon forming part of a nuclear conjugated double bond system.

24. A 10,13-dimethyl cyclopentano polyhydro phenanthrene compound having a hydrocarbon group linked through an ether oxygen to the 3-carbon which forms part of a nuclear conjugated double bond system.

25. The method of producing an enolic ether of a 10,13-dimethyl-cyclopentano-polyhydro-phenanthrene compound which comprises subjecting a 10,13-dimethyl-cyclopentano-polyhydro-phenanthrene compound having a keto group and a double bond in the first ring to the action of an orthoformic acid ester.

ERWIN SCHWENK.
BRADLEY WHITMAN.